United States Patent [19]

Dix et al.

[11] 4,446,313

[45] May 1, 1984

[54] POLYETHER POLYOL PROCESS

[75] Inventors: Peter Dix; George A. Pogany; Parminder Sangha, all of Amsterdam, Netherlands

[73] Assignee: Shell Oil Company, Houston, Tex.

[21] Appl. No.: 285,653

[22] Filed: Jul. 21, 1981

[30] Foreign Application Priority Data

Aug. 6, 1980 [GB] United Kingdom ............... 8025696

[51] Int. Cl.$^3$ .............................................. C07H 1/00
[52] U.S. Cl. ................................. 536/18.6; 536/18.3; 536/120; 568/620
[58] Field of Search ............... 536/120, 18.3, 18.6; 568/620

[56] References Cited

U.S. PATENT DOCUMENTS

| | | | |
|---|---|---|---|
| 2,902,478 | 9/1959 | Anderson | 536/120 |
| 2,927,918 | 3/1960 | Anderson | 536/120 |
| 2,927,919 | 3/1960 | Anderson | 536/120 |
| 3,073,788 | 1/1963 | Hostettler et al. | 536/120 |
| 3,169,934 | 2/1965 | Dennett et al. | 536/120 |
| 3,305,542 | 2/1967 | Carlberg et al. | 536/120 |
| 3,317,508 | 5/1967 | Winquist, Jr. et al. | 536/120 |
| 3,326,890 | 6/1967 | Engelskirchen et al. | 536/120 |
| 3,357,970 | 12/1967 | Ulyatt | 536/120 |
| 3,865,806 | 2/1975 | Knodel | 536/120 |
| 3,941,769 | 3/1976 | Maassen et al. | 536/120 |
| 4,166,172 | 8/1979 | Klein | 536/120 |

*Primary Examiner*—Johnnie R. Brown

[57] ABSTRACT

Process for the manufacture of a polyether polyol by reaction between an organic compound containing 2 or more active hydrogen atoms in the molecule and an alkylene oxide in the presence of a catalyst comprising a tertiary amine NRR'$_2$, in which R is a cycloalkyl or cycloalkenyl group and each R' may be an alkyl, cycloalkyl or cycloalkenyl group.

9 Claims, No Drawings

4,446,313

POLYETHER POLYOL PROCESS

BACKGROUND OF THE INVENTION

1. Field of the Invention

This invention relates to a process for the manufacture of polyether polyols from polyols and alkylene oxide.

2. Background

The invention relates to a process for the manufacture of polyether polyols by reaction between an organic compound containing 2 or more active hydrogen atoms in the molecule and an alkylene oxide in the presence of an amine catalyst. Such polyether polyols are suitable starting materials for the production of polyurethanes.

As used herein the term "active hydrogen atom" means a hydrogen atom capable of reacting according to the Zerewitinoff reaction.

It is well known to carry out the above-mentioned oxyalkylation reaction using as catalyst an organic amine, and preferably a tertiary amine, such as a trialkylamine. See, for example, U.S. Pat. No. 3,357,970, issued Dec. 12, 1967. However, it has been found that under such conditions the reaction requires in many cases a comparatively long induction period, which can be reduced by including in the reaction system a certain amount of water but this procedure is not desirable if a high functionality (i.e., the number of hydroxyl groups per molecule) of the resulting product is aimed at. Other disadvantages of carrying out the oxyalkylation reaction under the above-mentioned conditions include a rather low reaction rate, even after the induction period, and comparatively high alkylene oxide losses unless large catalyst quantities are used.

It has now been found that the disadvantages described above can be circumvented by the use, as catalyst or catalyst component, of a tertiary amine of a special structure, namely one in which at least one of the carbon atoms attached to the nitrogen atom forms part of a non-aromatic ring structure whilst the other carbon atoms attached to the nitrogen atom do not form part of that ring structure.

It is perhaps useful to add that the use of such amines as catalysts in the formation of polyurethane foams has been known for a long time. It is therefore surprising that their catalytic activity in the oxyalkylation reaction has not been described before.

SUMMARY OF THE INVENTION

The present invention provides a process for the manufacture of a polyether polyol by reaction between an organic compound containing 2 or more active hydrogen atoms in the molecule and an alkylene oxide in the presence of an amine catalyst, characterized in that the catalyst comprises a tertiary amine $NRR'_2$, in which R is a cycloalkyl or cycloalkenyl group and each R' may be an alkyl, cycloalkyl or cycloalkenyl group. In a preferred embodiment the catalyst composes additionally a nitrogen compound containing in the molecule at least one hydrogen atom which is capable of reacting with alkylene oxides. The use of the above-described catalyst provides for a short induction period and a rapid reaction rate while minimizing alkylene oxide losses.

DESCRIPTION OF THE PREFERRED EMBODIMENTS

The present invention provides a process for the manufacture of a polyether polyol by reaction between an organic compound containing 2 or more active hydrogen atoms in the molecule and an alkylene oxide in the presence of an amine catalyst, characterized in that the catalyst comprises a tertiary amine $NRR'_2$, in which R is a cycloalkyl or cycloalkenyl group and each R' may be an alkyl, cycloalkyl or cycloalkenyl group. R has a carbon number ranging from 3 to about 12, preferably from 3 to about 8 and R' has a carbon number ranging from 1 to about 12, preferably from 1 to about 8. When R' is alkyl it preferably ranges from 1 to about 8, and most preferably from 1 to 2.

Suitable tertiary amines to be used as catalyst or catalyst component in the process of the invention are tricycloalkylamines, tricycloalkenylamines, N-alkyl-N,N-dicycloalkylamines and N-alkyl-N, N-dicycloalkenylamines. Preferably a tertiary amine is used, in which R is a cyclohexyl group and each R' is an alkyl group, such as N-methyl-N-ethylaminocyclohexane, N-methyl-N-propylaminocyclohexane and N,N-diethylaminocyclohexane. Particularly preferred as catalyst or catalyst component is dimethylaminocyclohexane.

The process of the invention may be carried out using as catalyst the tertiary amine $NRR'_2$ as defined hereinbefore in combination with other components, and the use of such combinations, particularly with certain nitrogen compounds, is preferred in many cases. In a preferred embodiment of the present process the amine catalyst also additionally comprises a nitrogen compound containing in the molecule at least one hydrogen atom which is capable of reacting with alkylene oxides. Suitable nitrogen compounds are primary or secondary amines, such as dimethylamine, diethylamine and alkylenediamines, e.g. ethylenediamine or triethylenediamine. Other suitable nitrogen compounds include amines containing at least one hydroxyl group in the molecule, and preferred amines of this category are tertiary amines, such as 2-(dimethylamino)ethanol. In a particularly preferred embodiment of the process of the invention a catalyst comprising dimethylaminocyclohexane and 2-(dimethylamino)-ethanol is used.

Although the invention is advantageous with respect to the oxyalkylation of any organic compound containing 2 or more active hydrogen atoms in the molecule or a mixture of such compounds, it is in many cases preferred to use certain types thereof, for instance aliphatic amines, and in particular hydroxyalkyl-substituted ones, such as monoethanolamine, di-ethanolamine, or tri-ethanolamine. Another category of suitably employed starting material (although to a certain extent overlapping the last-mentioned category are aliphatic polyhydroxy compounds containing 2 or 3 hydroxyl groups in the molecule, such as diphenylolpropane, trimethylolpropane and glycerol. The invention is of particular value for the oxyalkylation of polyhydroxy compounds having a relatively high melting point, for instance a melting point above 80° C., such as pentaerythritol, methylglucosides, mannitol, dulcitol, glucamine and glucosamine. Particularly preferred polyhydroxy compounds used in the process of the invention are sucrose and sorbitol, which upon conversion with alkylene oxide yield polyether polyols which are in great demand as starting materials for the production of rigid polyurethane foams. If desired, mixtures of organic compounds containing 2 or more active hydrogen atoms in the molecule may be used as starting material in the present process, as well as mixtures of one or more of such compounds with other organic compounds.

Alkylene oxides, which are particularly suitable for use in the process of the invention are, for instance, ethylene oxide, propylene oxide, butylene oxide, and/or mixtures thereof. If desired, the alkylene oxide may be added to the reaction mixture in more than one step, whilst different oxides may be used in each step. For example, propylene oxide may be used as the initial reactant, whilst at a later stage ethylene oxide is incorporated into the reaction mixture, or vice versa.

The amount of the amine catalyst used in the present invention is suitably within the range of about 0.2 to about 10% by weight of the active hydrogen atoms-containing compound and preferably within the range of about 0.5 to about 5% by weight thereof.

The general conditions for the reaction between alkylene oxide and active hydrogen atom-containing compound according to the present invention may be selected in analogy with those described in the literature for the alkoxylation of such compounds. Temperatures between about 50° and about 160° C., preferably between about 80° and about 120° C., are suitably employed, whilst pressures up to about 6 bar or more may be used. The amount of alkylene oxide to be used in the reaction according to the present process is usually selected so as to be sufficient for the formation of a polyether, or a mixture of polyethers, having the desired molecular weight and functionality.

The presence of substantial amounts of water is usually avoided for the reason as indicated hereinbefore, although a small proportion, usually no more than about 0.2–1 mol per mol of active hydrogen atoms-containing organic compound, of water may in some cases by advantageous to achieve a further reduction of the induction period of the reaction, if any.

After the reaction has reached the desired stage the polyether polyol or polyether polyols formed may be collected without further treatment or, if desired, neutralized and/or purified, e.g. by treatment with active carbon or natural or synthetic absorbent earths, followed by filtration. It will be clear that numerous other substances may be added before, during and/or after the reaction.

The polyether polyols obtained in the process of the invention show a high reactivity with respect to isocyanates and are, as already indicated above, particularly suitable for the production of cellular or non-cellular polyurethanes in accordance with the general methods described in the literature, for instance by reacting the polyether polyols, possibly admixed with other active hydrogen atoms-containing compounds, with organic polyisocyanates, if desired in the presence of other substances, such as foaming agents, surface-active agents, flame-retarding agents and other additives known in the art.

The invention will be illustrated by the following Examples which are provided for illustration purposes only and are not to be construed as limiting the invention.

EXAMPLE I

Two experiments were carried out, in which 2160 g of sucrose were introduced into a stainless steel pressure reactor equipped with cooling coils. The reactor was sealed and inert material removed by vacuum.

The amine catalyst used was mixed with an equal amount by weight of cooled propylene oxide and introduced into the reactor. Thereafter the total amount of 5256 g of propylene oxide admixed with 584 g of ethylene oxide was introduced into the reactor and the time recorded.

The reaction mixture was heated to 90° C. by means of an oil jacket, and this temperature was maintained by using the cooling coils. As the reaction proceeded the pressure dropped, indicating a decrease of the amount of alkylene oxide present. The mixture was allowed to react until the pressure became constant, whereupon the time was again recorded and the difference of the two time recordings was noted as being the reaction time.

After removing unreacted alkylene oxide by vacuum distillation the polyether polyol so obtained was an alkyoxylated sucrose ether having a hydroxyl value of 363 and a viscosity of 6205 cSt at 38° C.

Further conditions of the experiments and the results obtained thereby are shown in columns A and B of Table I.

EXAMPLE II

In three experiments Example I was repeated with the only exception that an amine catalyst outside the scope of the invention was used.

Comparative data and results are given in columns C–E, inclusive, of Table I, and clearly show that considerably longer reaction times than those of Example I are required.

TABLE I

| Column | | A | B | C | D | E |
|---|---|---|---|---|---|---|
| Catalyst | (a) | DMAC | DMAC | DMAE | DMAE | DMAE |
| | (b) | — | DMAE | — | TPA | TEA |
| Amount of catalyst as % w of sucrose | (a) | 2.5 | 1.2 | 2.0 | 1.2 | 1.2 |
| | (b) | — | 0.8 | — | 0.8 | 0.8 |
| Final absolute pressure (bar) | | 0.6 | 0.7 | 1.4 | 1.2 | 1.5 |
| Reaction time (min) | | 360 | 300 | 414 | 445 | 508 |

DMAC = dimethylaminocyclohexane
DMAE = 2-(dimethylamino)ethanol
TPA = tripropylamine
TEA = tri-ethylamine

We claim:

1. A process for the manufacture of a polyether polyol which process comprises reacting sucrose or sorbitol with ethylene oxide, propylene oxide or a mixture thereof at a temperature ranging from about 80° C. to about 120° C. and at a pressure of up to 6 bar in the presence of a catalyst which comprises: (a) a tertiary amine NRR'$_2$, in which R is a cycloalkyl or cycloalkenyl group and each R' may be an alkyl, cycloalkyl or cycloalkenyl group and (b) a nitrogen compound containing in the molecule at least one hydrogen atom which is capable of reacting with alkylene oxides.

2. The process as claimed in claim 1, in which R is a cyclohexyl group and each R' is an alkyl group.

3. The process as claimed in claim 2, in which the tertiary amine is dimethylaminocyclohexane.

4. The process as claimed in claim 1, in which the nitrogen compound is a primary or secondary amine.

5. The process as claimed in claim 1, in which the amine contains at least one hydroxyl group in the molecule.

6. The process as claimed in claims 5, in which the nitrogen compound is a tertiary amine.

7. The process as claimed in claim 6, in which the tertiary amine is 2-(dimethylamino)ethanol.

8. The process as claimed in claim 1, in which the amine catalyst is used in an amount within the range of about 0.2 to about 10% by weight of the sucrose or sorbitol.

9. The process as claimed in claim 8, in which the amine catalyst is used in an amount within the range of about 0.5 to about 5% by weight of the sucrose or sorbitol.

* * * * *